US009560389B2

(12) United States Patent
Civiletto et al.

(10) Patent No.: US 9,560,389 B2
(45) Date of Patent: Jan. 31, 2017

(54) NETWORK-BASED CONTENT STORAGE

(75) Inventors: John Civiletto, Suwanee, GA (US);
Edgar V. Shrum, Jr., Smyrna, GA (US); Francisco Gonzalez, Atlanta, GA (US); Louise Mary Wasilewski, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 1054 days.

(21) Appl. No.: 13/553,587

(22) Filed: Jul. 19, 2012

(65) Prior Publication Data
US 2014/0023340 A1 Jan. 23, 2014

(51) Int. Cl.
*H04N 9/80* (2006.01)
*H04N 21/218* (2011.01)
*H04N 21/239* (2011.01)
*H04N 21/472* (2011.01)

(52) U.S. Cl.
CPC ...... *H04N 21/2181* (2013.01); *H04N 21/2393* (2013.01); *H04N 21/47202* (2013.01)

(58) Field of Classification Search
CPC ............ H04N 21/2181; H04N 21/2393; H04N 21/47202
See application file for complete search history.

(56) References Cited

U.S. PATENT DOCUMENTS

| 8,560,629 B1* | 10/2013 | Bhatti et al. ................. 709/217 |
| 2003/0012554 A1* | 1/2003 | Zeidler .................... H04N 5/76 386/297 |
| 2005/0097598 A1* | 5/2005 | Pedlow et al. .................. 725/31 |

* cited by examiner

*Primary Examiner* — Tat Chio
(74) *Attorney, Agent, or Firm* — Sutherland Asbill & Brennan LLP

(57) ABSTRACT

Systems, methods, and computer-readable media for network-based storage of requested content are provided. A request for a content item may be received by a content storage device from a customer. Portions of the content item may be extracted from the content item. The content storage device may store the extracted portions of the content item specific to the customer. Additionally, the remainder of the content item may be stored by the content storage device separately from the stored extracted portion. The content item may be reconstructed for the customer using the extracted portions of the content item specific to the customer and the remainder of the content item.

20 Claims, 6 Drawing Sheets

NETWORK-BASED CONTENT STORAGE

FIELD OF THE DISCLOSURE

Aspects of the invention relate generally to recording and/or storing content, such as broadband content, and more particularly, to network-based recording and/or storing of content.

BACKGROUND

A wide variety of service providers, such as cable providers and satellite providers, provide broadband communications services, such as television, movie, video game, and/or music services, to customers. Many customers utilize digital video recording ("DVR") devices to record, store, and/or manage broadcast content for subsequent viewing. These DVR devices are typically dedicated devices that are situated within a customer's home, and the DVR devices allow users to schedule programming content for recording and/or storing. However, compression techniques and the hardware resources of DVR and network storage devices are limited. For example, a customer is only able to record a certain volume and/or number of recordings at a given time utilizing a DVR device, and no additional incremental compression gains can be attained. Moreover, DVR and network storage devices add to the hardware expenses and maintenance costs incurred by the service providers. Hardware associated with DVR and network storage devices is also prone to failure, resulting in the customer potentially losing a portion and/or all of the recordings on the DVR device. Accordingly, finding improved ways to record, store, and/or manage content and/or services continues to be a priority.

BRIEF DESCRIPTION

Some or all of the above needs and/or problems may be addressed by certain embodiments of the invention. Embodiments of the invention may include systems, methods, and computer-readable media for recording and/or storing content. In one embodiment, a method for recording and/or storing content may be provided. A request for a content item may be received by a content storage device from a customer. The content storage device may then extract a portion of the content item and store the extracted portion specific to the customer. Additionally, the remainder of the content item may be stored by the content storage device separately from the stored extracted portion.

In accordance with another embodiment of the invention, a content storage device may be provided. The content storage device may include at least one communications interface, at least one processor, and at least one memory. The at least one communications interface may be configured to receive, from a customer, a request for a content item. The at least one processor may be configured to (i) extract a portion of the content item, (ii) direct storage of the extracted portion of the content item specific to the customer, and (iii) direct separate storage of a remainder of the content item. The at least one memory may be configured to store the extracted portion specific to the second customer.

In accordance with yet another embodiment of the invention, a computer-readable media comprising instructions for storing content may be provided. Respective requests for a content item may be received from a plurality of customers. Based at least in part upon the received requests, the content storage device may process the content item in order to extract a portion of the content item. The content storage device may also process the extracted portion to uniquely encode the extracted portion in association with each of the plurality of customers. A respective uniquely encoded portion may be stored by the content storage device in association with each of the plurality of customers. Additionally, the remainder of the content item may be stored by the content storage device.

Additional systems, methods, computer-readable media, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Overview

Figure 1:
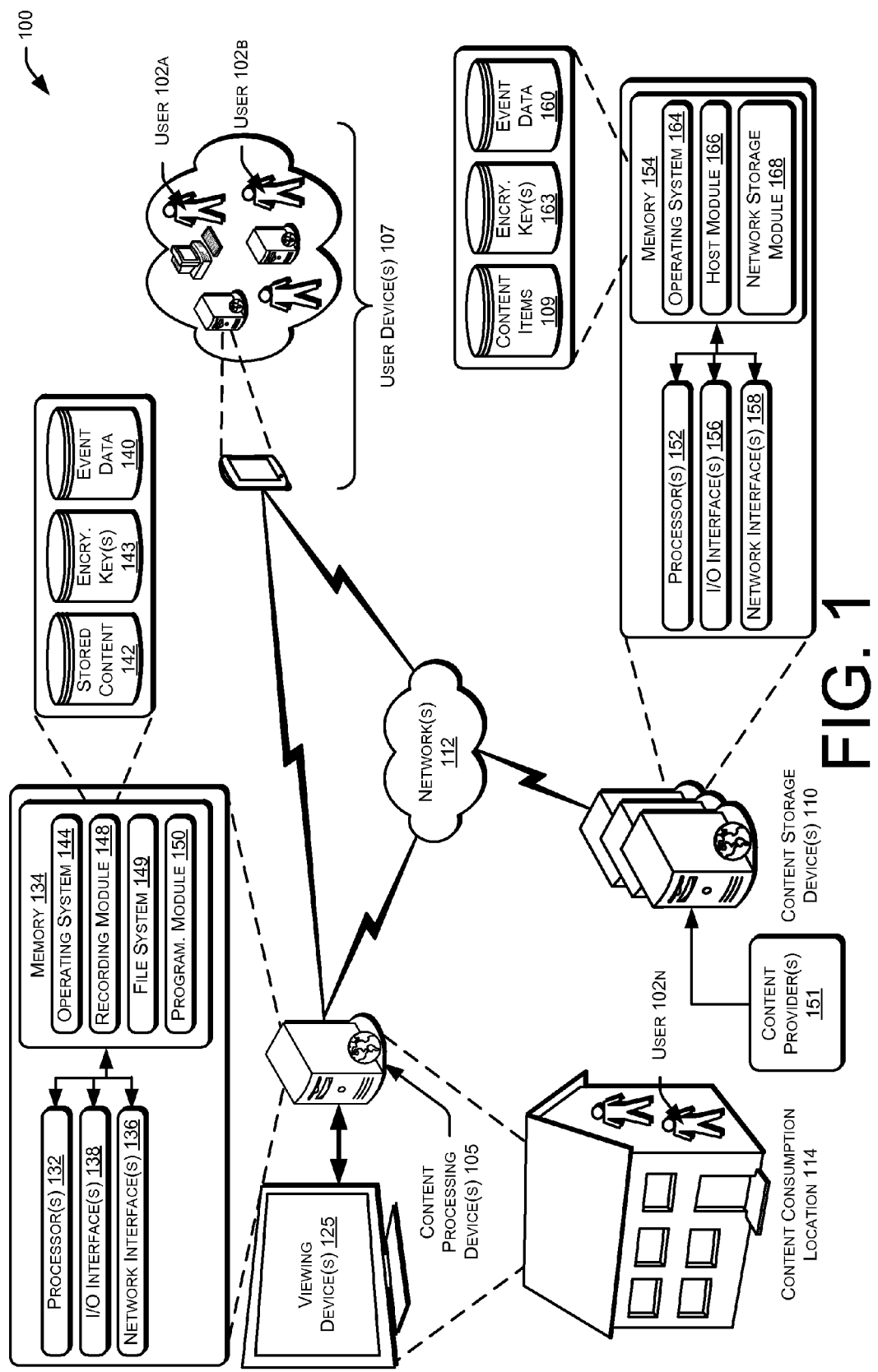
FIG. 1 illustrates a block diagram of an example system that may be utilized to facilitate the recording, storing, and/or playback of content items, according to an illustrative embodiment of the invention.

As noted above, embodiments of the present disclosure are directed to, among other things, systems, methods, and computer-readable media for recording and/or storing content, for example, via a network DVR or other network content storage device. As an overview, users (i.e., customers) of a content storage service may access remote content storage devices via one or more networks. Remote content storage devices, like network DVRs, may record live, streaming, or pre-recorded content at the request of users of the service. Thus, users may utilize the remote content storage devices to record, store, and/or manage digital content. In some examples, digital content may include movies, television shows, music, video games, other digital content, combinations of the foregoing, and the like.

In some instances, the remote content storage devices may be owned, operated, and/or controlled by service providers such as cable companies, satellite content broadcasters, other broadband service providers, or by non-facility-based providers. While owned, operated, and/or controlled by service providers, the remote content storage devices may, nevertheless, be in communication with and controlled based at least in part on requests from user devices. In some examples, user devices may include content processing devices that are directly coupled to viewing devices, such as but not limited to set-top boxes, local DVRs, smart televisions ("TVs"), multimedia computing devices, combinations of the foregoing, or the like. Such user devices may be permanently or semi-permanently located within a content consumption location (e.g., the customer's home or business) and may be coupled to one or more networks, such as the Internet, for accessing the content storage devices.

Alternatively, or in addition, user devices may include portable devices that may or may not be directly coupled to viewing devices and may not be located within a content consumption location. Examples of portable devices include, by way of example only, cell phones, laptops, personal digital assistants ("PDAs"), tablet personal computers ("PCs"), or desktop PCs that are not located at the user's home or business but are accessible via one or more networks, such as the Internet. Additionally, in some examples, a user device may fall into both categories in that it may act as a content processing device and a portable device.

In one non-limiting example, a user may request a content item be recorded for later playback, for example a particular TV show, by the content storage device of a cable company. In this example, to make such a request, the user may program, select, or otherwise facilitate the request via a local content processing device (e.g., a set-top box) at the user's home that is in communication with the content storage device, via a network such as the Internet. In some examples, the user may make such a selection by depressing buttons on the content processing device, by using a remote control of the content processing device, by utilizing a wireless or a wired mouse of the content processing device, by a voice command, or by a gesture-based movement. Alternatively, the user may make such a selection by utilizing a portable device coupled to a network, such as the Internet. For example, the user may request that the TV show be recorded for later playback by activating a mobile application of a cell phone, tablet PC, or other PC while the user is not physically located at the content viewing location.

In another non-limiting example, a user may request that a content item, such as a song or movie, be downloaded, streamed, or otherwise received at a viewing device, or other output device. In this example, the song or movie need not be "playing" or otherwise be part of a scheduled broadcast. For example, the song or movie may simply be part of a library of songs or movies available for consumption. In this example, much like above, the user may request the content item via a local content processing device coupled to the viewing, audio, or output device at a particular location, or the user may request the content item via a portable device. In either case, as above, the content processing device and/or the portable device may be communicatively coupled to the remote content storage device via one or more networks, such as the Internet.

In some instances, a user may upload content to the content storage device. This may be facilitated via the content processing device or the portable device. Either way, the content storage device may receive, store, process, and/or manage the uploaded content for later playback by the user or other users of the content storage device that controls the network content storage device.

Further, the content storage device may implement a procedure for extracting portions of the content items, uniquely storing the extracted portions for each user, and storing a remainder of the content item once the extracted portions have been removed. That is, regardless of whether the content storage service is handling a request to record content, a request to provide content, a request to store uploaded content, or any other request, unique portions, versions, copies, samples, and/or pieces of the content item may be stored for each user. Additionally, the remainder of the content item (i.e., what is left of the content item once portions have been extracted) may be stored such that the content item may be reassembled for later playback by a requesting user. In this way, at least in some examples, the remainder may be stored redundantly while the extracted portions may be stored a single time for each respective user.

Illustrative Architecture

Embodiments of the invention now will be described more fully hereinafter with reference to the accompanying drawings, in which embodiments of the invention are shown. The foregoing ideas may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and computer-readable media comprising instructions for facilitating the network-based recording and/or storing of content, such as content items desired and/or selected by a user or users. For example, embodiments of the invention may utilize network-based resources associated with a broadband service provider or content provider in order to record and/or store content items on behalf of users of the service provider or content provider. Additionally, as briefly mentioned above, the content storage device may facilitate the recording and/or storing of unique copies of content items on behalf of different users. For example, a plurality of users or consumers may request the recording of the same content item. Following receipt of the user requests, the content storage device may identify one or more portions of the content item to be uniquely stored on behalf of each of the users. The identified one or more portions, samples, or headers may be extracted from the content item, and unique copies of the one or more portions, samples, or headers may be respectively stored for each of the users. Additionally, the content item, a subset of the content item, or the remainder of the content item may be stored by the content storage device following extraction of the one or more portions. Utilizing the stored one or more unique portions, samples, or headers for a user and the stored remainder, the content storage device may reconstruct the content item, and provide the content item to a user.

A wide variety of different types of user or consumer devices may be utilized as desired in various embodiments of the invention. Examples of suitable user or consumer devices include, but are not limited to, user premise devices (e.g., set-top boxes, smart televisions, routers, etc.) and/or other user devices (e.g., personal computers, mobile devices, etc.). In certain embodiments, a user device may be utilized by a user to request the network recording of a content item. Additionally, a user device may be utilized by the user to access and/or download the recorded content item from the content storage device. In certain embodiments, the same user device may be utilized to request a recording and to subsequently download the recorded content item. In other embodiments, separate user devices may be utilized to request a recording and to subsequently download the recorded content item. For example, a first set-top box may be utilized to request a network recording, and a second set-top box may be utilized to download the recorded content item. As another example, a user may utilize a personal computer or mobile device to access the content storage device to request the recording of a content item, and the recorded content item may be subsequently downloaded from the content storage device by a set-top box.

As desired, a wide variety of suitable methods and/or techniques may be utilized to facilitate the storage of the unique recording, copies, or versions of a content item. For example, as set forth above, at least one unique sample may be extracted from the content item, or alternatively, any number of samples of the content item may be extracted as desired in various embodiments of the invention. Additionally, each of the extracted samples may have any size, duration, or length. For example, a portion of the content item having a predetermined length of time (e.g., one minute, two minutes, etc.) may be extracted from the content item at regular intervals (e.g., every five minutes, every ten minutes, etc.). Additionally, in one example, one or more Moving Picture Experts Group ("MPEG") headers may be extracted from the content item including, but not limited to, a quantization matrix. Once extracted, the one or more portions, samples, or headers of the content item may be processed by the content storage device in a manner that is unique to the user that requested the content item. For example, the one or more extracted portions of the content item may then be encrypted in a manner specific to the user. In certain embodiments, the one or more extracted portions may be encrypted in a manner specific to a household account, an individual user account, or user account associated with the user and/or one or more user devices. Subsequently, the extracted portions may be accessed from memory, decrypted if needed, and combined with the remainder of the content item in order to reconstruct the content item for the user.

As a result of encrypting or otherwise processing one or more extracted portions of the content item, unique copies of the content item may be prepared for each user that requests the content item. Because each copy of the extracted portions has been processed in a manner specific to a respective user or a respective user account, only the users associated with the respective copies may be able to download and consume (e.g., view, listen to, etc.) the particular copies of the content item. In other words, a reconstructed copy of the content item, that is formed by merging the processed (e.g., encrypted/decrypted) extracted portions and a remainder of the content item, may only be accessible by a user that requested the particular recording of the content item. Additionally, as a result of uniquely storing and/or processing only portions of the content item rather than the entire content item, the storage space utilized by the content storage device may be reduced. That is, redundant copies of every portion of each requested content item may not need to be stored. As such, less memory may be utilized to store unique samples (e.g., slices, segments, headers, footers, etc.) of a content item on behalf of each requesting user than would be utilized if unique copies of the entire content item were stored for each requesting user.

FIG. 1 depicts an illustrative architecture 100 in which techniques for network-based recording and/or storing of content items may be implemented. In architecture 100, one or more users 102a-n may utilize one or more content processing devices 105 and/or user devices 107 to request content items 109 from one or more content storage devices 110 via one or more networks 112. As noted above, content storage devices 110 may be owned, operated, and/or otherwise controlled by a service provider, such as but not limited to a broadband cable provider.

Additionally, in some aspects, a user 102 may interact with a content processing device 105 for requesting content items from the content storage devices 110 via the networks 112. The user 102 may be physically located within a content consumption location 114, such as a home or business, and access the content processing device 105 directly. In this example, the content processing device 105 may reside within the content consumption location 114 and may be directly, or indirectly, coupled to a viewing device 125, such as a TV or other output device and may be accessible via the one or more networks 112. In this way, the content processing device 105 may be able to communicate with the content storage device 110. Additionally, or alternatively, the user 102 may interact with a user device 107 that is also accessible via the networks 112. The user device 107 may be configured to request content items from the content storage device directly via the networks 112, or it may be configured to facilitate requests for content items by transmitting the request via the content processing device 105.

The architecture 100 may include, for example, any number of user devices 107 and/or content storage devices 110. The user devices 107 may include content processing devices 105 and/or any number of other portable user devices 107. Additionally, a content recording server or system may be associated with the content storage device 110. As noted above, any number of suitable networks 112 may facilitate communications between various components of the architecture 100. Additionally, as desired, one or more components of the architecture 100 may be processor-driven components or devices. In certain embodiments, certain components of the architecture 100 may be combined. For example, a content storage device 110 may be incorporated into a content processing device 105 and vice-versa.

With further reference to FIG. 1, any number of content processing devices 105 may be provided. Each content processing device 105 may be associated with a customer of a service provider (e.g., a cable service provider, a satellite service provider, a content provider, etc.) that controls and/or operates the content storage device 110. As desired, a single customer may be associated with multiple content processing devices 105. For example, multiple set-top boxes may be situated within a content consumption location 114 (e.g., the customer's home).

Each content processing device 105 may be a suitable device or component for facilitating the receipt, processing, and/or output of at least one broadband signal, such as a broadband cable signal, a broadband satellite signal, or other network-accessible content. Additionally, the content processing device 105 may facilitate the receipt and processing of user requests to record and/or store content items, such as user requests to record and/or store content items that will be broadcast at a subsequent point in time (e.g., upcoming television content, etc.), content items that are to be or have been uploaded (e.g., music or movie content uploaded by a user), or content items that are to be played (e.g., a video game, etc.). In certain embodiments, the content processing device 105 may be a customer premise device or component that is situated within a customer's household or other structure associated with the customer. Additionally, the content processing device 105 may be located within a distribution network or with the service provider. The content processing device 105 may include suitable hardware and/or software components capable of receiving and processing a broadband signal (e.g., a cable signal, a satellite signal, etc.) output by a content storage device 110, such as a cable content storage device or a satellite content storage device. Examples of suitable content processing devices include, but are not limited to, a personal computer, a set-top box ("STB") (e.g., a cable STB, a digital satellite STB, an Internet Protocol ("IP") Television STB, etc.), a virtual STB, an embedded STB, etc.

In certain embodiments, the content processing device 105 may be connected, directly or indirectly, to one or more viewing devices 125, or other output devices, such as but not limited to a television, a computer monitor, or speakers associated with a customer. In other embodiments, the content processing device 105 may be embedded, incorporated into, and/or executed on the viewing device 125. In operation, the content processing device 105 may receive at least a portion of a broadband data signal, or other content, output by the content storage device 110, and the content processing device 105 may convert at least a portion of the received signal into content which is displayed or otherwise output by the viewing device 125.

Additionally, as desired, the content processing device 105 may be configured to direct or request network-based recording and/or storing of at least a portion of the broadband content that will be received by the content processing device 105. Following a network-based recording, the content processing device 105 may be configured to stream, download or otherwise receive recorded content. As desired, the content processing device 105 may receive a broadband data signal and/or recorded content via any number of suitable networks 112, such as a cable network that includes any number of optical fibers, coaxial cables, and/or cable drops, a satellite network that includes a suitable satellite dish and/or connecting cables, a wireless network (e.g., a Wi-Fi or a 4G network), and/or other suitable networks such as, but not limited to, the Internet. Additionally, any number of intermediary devices, such as broadband modems, routers, etc., may be situated between the content storage device 110 and the content processing device 105.

In one embodiment, the content processing device 105 may provide a content item, such as but not limited to a video content item, a video game content item, or an audio content item, to the content storage device 110. The content storage device 110 may then record and/or store the provided content and/or a portion of the provided content. In some examples, the content processing device 105 may later request the content item from the content storage device 110 such that a user may consume the content item via the viewing device 125 of the content processing device 105 or via a viewing device associated with a different device, such as but not limited to a mobile device or a personal computer other than the content processing device 105 that originally provided the content item.

As desired, the broadband signal provided to the content processing device 105 may include a wide variety of data components including, but not limited to, a television signal, a digital television signal, data associated with a Voice over IP ("VoIP") telephone service, data associated with Internet service, data associated with home monitoring services, etc. The content processing device 105 may receive and process the broadband signal. As desired, the content processing device 105 may selectively output a portion of the broadband signal, such as digital television data (e.g., audio and/or video data), electronic program guide data, various Web pages, audio files, video games, etc., to the viewing device 125 for consumption. Additionally, in certain embodiments, the content processing device 105 may selectively store received content items in one or more suitable memory devices for subsequent output for presentation to a customer or user via the viewing device 125. For example, stored content items downloaded from the content storage device 110 may be stored as desired by the content processing device 105. Any number of suitable connections and/or connecting devices, such as coaxial cables, High-Definition Multimedia Interface ("HDMI") cables, wireless connections, etc., may be utilized to connect the content processing device 105 to a suitable viewing device 125. Additionally, in certain embodiments, the content processing device 105 may output audio data to any number of audio components, such as a home theater system, a stereo system, remote speakers, a portable music player, a smart phone, a tablet PC, etc.

The content processing device 105 may be a suitable processor-driven device that facilitates the receipt, processing, and/or output of a broadband signal or content items. Additionally, the content processing device 105 may be a suitable processor-driven device that facilitates the receipt and processing of user commands to record and/or store content items. As such, the content processing device 105 may include any number of computing devices, such as a personal computer, a digital assistant, a PDA, a smart phone, a digital tablet, an Internet appliance, an application-specific circuit, a microcontroller, a minicomputer, or any other processor-based device. The execution of suitable computer-implemented instructions or computer-executable instructions by the content processing device 105 may form a special purpose computer or other particular machine that is operable to facilitate the processing of recording commands and/or the processing and output of broadband content (including downloaded recorded content).

With further reference to FIG. 1, each content processing device 105 may include one or more processors 132, one or more memory devices 134, one or more transceivers and/or network interfaces 136, and/or one or more input/output ("I/O") interfaces 138. The processors 132 may be configured to execute any number of software applications and/or computer-readable or computer-executable instructions. The memory devices 134 may include any number of suitable memory devices, such as caches, read-only memory devices, random access memory devices, flash memory devices, magnetic storage devices, removable storage devices (e.g., memory cards, etc.), or the like. The memory devices 134 may include internal memory devices and/or external memory devices in communication with the content processing device 105. The memory devices 134 may store data, executable instructions, and/or various program modules utilized by the processors 132. Examples of data that may be stored by the memory devices 134 include event data 140, stored content 142 (e.g., downloaded stored and/or recorded content, locally stored and/or recorded content, extracted portions of recorded and/or stored content, metadata, etc.), encryption keys 143, and/or any number of suitable program modules that may be executed by the processors 132, such as an operating system ("OS") 144, a recording module 148, a file system 149, and/or a programming module 150.

The event data 140 may include any suitable data that facilitates the operation of the content processing device 105, the processing of a received broadband signal, the receipt of recording requests, the processing of recording requests, the recording of content items, and/or the processing of recorded content items. For example, the event data 140 may include, but is not limited to, user profile information, information associated with requests to record content items, information associated with the content storage device 110, information associated with content items recorded by the content storage device 110, and/or information associated with retrieving content items from the content storage device 110.

The stored content 142 may include content items that have been downloaded and/or recorded by the content storage device 110 and downloaded to the content processing device 105 and, in certain embodiments, content items that have been recorded locally by the content processing device 105. For example, the stored content 142 may include content items that have been recorded by the content storage device 110 and communicated from the content storage device 110 to the content processing device 105. As another example, the stored content 142 may include video and/or audio content recorded by the content processing device 105 or a local recording device (e.g., a digital video recording device, a second content processing device 105, etc.) in communication with the content processing device 105. Further, the stored content 142 may include event data associated with the content items as well as encryption keys for the user of the particular content processing device 105. However, in some examples, event data may be stored separately in an event database 140.

In some examples, the stored content 142 may be stored in one or more internal memory devices (e.g., internal hard drives, internal flash drives, etc.) of the content processing device 105 and/or in one or more external memory devices accessible by the content processing device 105. In certain embodiments, a content processing device 105 may not include a memory for storing recorded content items. For example, recording may be completed by the content storage device, and recorded content items may be streamed to the content processing device 105 or provided to the content processing device 105 in a video on demand session.

The OS 144 may be a suitable software module that controls the general operation of the content processing device 105. The OS 144 may also facilitate the execution of other software modules, for example, an interactive program guide ("IPG") application, the recording module 148, and/or the programming module 150. The IPG application may be a suitable software module that facilitates the processing of program guide information received by the content processing device 105. For example, electronic program guide ("EPG") information may be included in a broadband signal received by the content processing device 105. The IPG application may format at least a portion of the received EPG data for presentation to a customer via an IPG grid. For example, received EPG data may be parsed and organized by channel and time slot. The organized data may then be formatted for display in an IPG grid. For example, based upon the receipt of a user command or request for IPG data, such as a selection of a remote control button or option associated with requesting guide data, the IPG application may direct the output of the IPG grid for presentation to the customer via the viewing device 125. Alternatively, the organized data may be formatted by genre or by content provider for presentation to the customer.

Once presented, a user may navigate through a displayed IPG grid in order to view scheduled content, such as current and upcoming television content. For example, the user may utilize a mouse, a gesture-based movement, a voice command, or a remote control to navigate through the IPG grid. As desired, the user may utilize the IPG grid to request the recording of content items. For example, the user may select an individual entry included in the grid, and the user may request that the content associated with the grid entry be recorded. A recording request made by the user may be received by the IPG application and provided to the recording module 148. The recording request may be made in advance of the content associated with the grid entry becoming available to the user, at the beginning of the grid entry, or during any point of the grid entry. The user may also choose to select previously aired content recorded and stored by another customer.

The recording module 148 may be a suitable software module that facilitates the recording of content items on behalf of a user. In operation, the recording module 148 may receive a user command or request to record a content item. In certain embodiments, a user command to record content may be received via a user's interaction with an IPG grid. In other embodiments, a user command to record content may be received via one or more suitable network communications. For example, a user may utilize a suitable user device 107 (e.g., a personal computer, a mobile device, etc.) to access a Web-based application hosted by the content storage device 110, and the user may request, via the Web-based application, that content be recorded. The content storage device 110 may then communicate the recording request to the content processing device 105 via one or more suitable networks 112, such as a service provider network. As yet another example, a user may utilize a user device 107 to directly access an application hosted by the content processing device 105 (e.g., the recording module), and a user command to record content may be communicated to the content processing device 105. For example, a wireless communications session (e.g., a Bluetooth communications session, a Wi-Fi communications session, etc.) may be established between a user device 107 and the content processing device 105, and a recording request may be received via the established communications session.

Once a user command to record a content item has been received, the recording module 148 may generate a request for network-based recording and/or storing of the content item, and the request for network-based recording and/or storing may be communicated to the content storage device 110. A wide variety of information may be included in the request, such as an identifier of the content processing device 105 and an associated format, an identifier of the content item, an identifier of the user, customer account information associated with the user, and/or a recording time. Following the communication of the request to the content storage device 110, the recording module 148 may receive one or more responses to the request. For example, the recording module 148 may receive an indication that the request has been received and/or an indication of whether a network recording of the content item has been authorized to be performed. In the event that a network recording has been authorized by the content storage device 110, a unique identifier and/or decryption information associated with the recorded content item may be communicated to the recording module 148 by the content storage device 110. The unique identifier may include information that facilitates subsequent retrieval of the recorded content item by the recording module 148, such as information identifying one or more blocks of memory at which the recorded content item is stored and/or access credentials for downloading the recorded content item. The unique identifier may be communicated by the content storage device 110 either before the recording has been completed or after the recording has been completed. As desired, the recording module 148 may utilize the unique identifier and/or any required access credentials to generate a request to download the recorded content item from the content storage device 110. Based upon the generated request, the content item may be communicated from the content storage device 110 to the content processing device 105 via one or more suitable networks 112, and the content item may be processed by the content processing device 105. For example, the content item may be output by the content processing device 105 for presentation to a user. As another example, the content item may be stored locally in one or more memory devices associated with the content processing device 105, such as stored content 142.

In embodiments in which decryption information is communicated to the content processing device 105, the decryption information may be utilized to decrypt encrypted portions of the downloaded content item. In this regard, the downloaded content item may be formatted into an appropriate form for output and/or display. In other embodiments, decryption information may be provided to the content processing device 105 prior to the communication of the content item to the content processing device 105. Once the content item is downloaded, the decryption information may be accessed by the content processing device 105 and utilized to decrypt any encrypted portions of the content item. In yet other embodiments, decryption of encrypted portions of the content item may be performed by the content storage device 110 prior to communication of the content item to the content processing device 105. In some aspects, the encryption information, such as an encryption key 143, etc., may be maintained by the content processing device 105 in the stored content 142. Alternatively, encryption keys 143 may be stored in separate memory, other than with stored content 142, or with the content storage device 110.

A wide variety of suitable methods and/or techniques may be utilized as desired by the recording module 148 to download a recorded content item from the content storage device 110. As one example, a passive downloading process may be utilized by the recording module 148 to request a download of the recorded content item. In this regard, the content item may be downloaded to the content processing device 105 in a background process that is transparent to the user. As desired, a wide variety of download parameters may be evaluated by the recording module 148 in order to determine when to download the content item. Examples of suitable download parameters that may be evaluated include, but are not limited to, a time of day, an available bandwidth for downloading content, a type of download to be performed (e.g., video on demand session, narrowcast, unicast, etc.), an availability of local resources associated with the content processing device 105, and/or a determination of when the recorded content will likely be viewed by the user. As desired in various embodiments, a wide variety of different types of download sessions may be utilized to download content to one or more content processing devices 105. Examples of suitable types of download sessions include background sessions (e.g., trickle download sessions, etc.), real-time download sessions, and/or faster than real-time download sessions. Additionally, as desired, historical behavior may be evaluated in conjunction with the download parameters. As a result of evaluating the download parameters, the recording module 148 may determine an appropriate time to download the content item. For example, the content item may be downloaded at a time when sufficient network bandwidth is available, such as late at night or while a user is likely at work or school. As another example, if it is determined that a user will likely request viewing of the content item before a certain time, attempts may be made to download the content item prior to reaching the time at which the content will likely be requested.

As another example of downloading a content item, the recording module 148 may request a download based upon the receipt of a user command or request to download, view, listen, and/or interact with the content item. For example, in certain embodiments, an indication or message indicating that the content has been recorded by the content storage device 110 may be output for presentation to the user. In response to the output indication or message, the user may request that the content item be downloaded. In other embodiments, a user request to view the content item may be received. Once the request to view the content item has been received, the recording module 148 may initiate a download of the content. In yet other embodiments, the recording module 148 may initiate a dynamic download session of the content item that permits download of the content and approximately simultaneous presentation of the downloaded content in real-time or near-real time. A dynamic download session may be similar to a video on-demand session. During a dynamic download session, the content may be streamed to the content processing device 105 by the content storage device 110, and the content item may be output for presentation to the user. In certain embodiments, the initiation of a dynamic download session may be a background operation that is transparent to the user. Additionally, as desired, the downloaded content item may be stored by the content processing device 105 in one or more suitable memory devices. In other embodiments, the recording module 148 may monitor the number of requests made by the user to download the content item, permitting download of the content item according to any rights associated with the content item. For example, if the content item is a view-once item, the recording module 148 may only permit the user to download the content item a single time.

With continued reference to FIG. 1, the programming module 150 may be a suitable software module that facilitates the processing and/or output of received broadband content, downloaded recorded content, and/or stored content. For example, the programming module 150 may be configured to format at least a portion of a content item for output by the content processing device 105 and presentation via the one or more viewing devices 125. A wide variety of content may be formatted for output by the programming module 150 as desired in various embodiments of the invention including, but not limited to, television content, audio content, VoIP telephone content, electronic program guide data, Internet and/or Web site content, game content, etc. Additionally, the programming module 150 may be configured to receive and process user commands associated with the output of content. For example, the programming module 150 may be configured to process user commands received via remote control input and/or user voice commands.

With continued reference to the content processing device 105, the one or more I/O interfaces 138 may facilitate communication between the content processing device 105 and one or more input/output devices, for example, one or more user interface devices, such as a remote control, display, keypad, mouse, pointing device, control panel, touch screen display, microphone, speaker, gesture-based recognition, etc., that facilitate user interaction with the content processing device 105. In this regard, user commands may be received by the content processing device 105. The one or more network interfaces 136 may facilitate connection of the content processing device 105 to one or more suitable networks 112, such as service provider networks or broadband networks (e.g., a cable network or a satellite network) and/or local area networks (e.g., a Bluetooth-enabled network, a Wi-Fi enabled network, etc.). In this regard, the content processing device 105 may receive a broadband signal for processing and output. Additionally, the content processing device 105 may communicate commands and/or requests to the content storage device 110, and the content processing device 105 may receive commands and/or information from the content storage device 110. Additionally, as desired, the content processing device 105 may communicate with any number of user devices 107 via one or more local area networks.

With continued reference to FIG. 1, each of the one or more viewing devices 125 may be any suitable device configured to receive content output by the content processing device 105 and to present at least a portion of the content to one or more users. Examples of suitable viewing devices 125 include, but are not limited to, televisions, monitors, projectors, and/or stereo systems or speaker(s).

With continued reference to FIG. 1, the content storage device 110 may include any number of systems and/or devices that facilitate the output of a broadband signal for receipt by any number of content processing devices 105. For example, the content storage device 110 may include systems associated with a cable service provider, a satellite service provider, or other service provider. In operation, the content storage device 110 may receive content from one or more content providers 151, format content for output in a broadband signal, and/or output the broadband signal. Examples of suitable systems that may be associated with the broadband source include, but are not limited to, a service provider head-end component, a conditional access system controller, any number of encryption devices, an electronic program guide data server, an on-demand server, a pay-per-view purchase server, a music server, etc.

According to an aspect of the invention, the content storage device 110 facilitates network recording and/or storing of content items on behalf of various customers of the service provider. As a result of facilitating network storage of content items, the limited resources of conventional digital video recording ("DVR") devices may be overcome. The content storage device 110 may include a wide variety of resources that facilitate the storage of any number of content items on behalf of customers. Additionally, as a result of storing content items at the network level, it may be possible to eliminate the conventional DVR devices, thereby reducing equipment costs and/or service costs incurred by the service provider.

The content storage device 110 may be a suitable processor-driven device configured to receive and process requests to store content items. Examples of suitable processor-driven devices that may be utilized as a content storage device 110 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the content storage device 110 may form a special purpose computer or other particular machine that is operable to facilitate the receipt of requests to store content items, the processing of received storing requests, the storing of content items, and/or the communication of stored content to one or more content processing devices 105 or other customer devices.

In addition to one or more processors 152, the content storage device 110 may include one or more memory devices 154, one or more input/output ("I/O") interfaces 156, and/or one or more network interfaces 158. The processors 152 may be configured to execute any number of software applications and/or computer-readable or computer-executable instructions. The memory devices 154 may include any number of suitable memory devices, such as caches, read-only memory devices, random access memory devices, flash memory devices, magnetic storage devices, etc. The memory devices 154 may store data, executable instructions, and/or various program modules utilized by the processors 152. Examples of data that may be stored by the memory devices 154 include event data 160, content items 109 recorded from content received from the one or more content providers 151, and/or encryption key(s) 163. Additionally, the memory devices 154 may be configured to store any number of suitable program modules that may be executed by the processors 152, such as an OS 164, one or more host modules 166, and/or a network storage module 168.

The event data 160 may include any suitable data that facilitates the operation of the content storage device 110, the receipt of storage requests, the processing of storage requests, the storing of content items, and/or the communication of stored content to one or more content processing devices 105 (or other customer devices). For example, the event data 160 may include, but is not limited to, information that facilitates communication with any number of content processing devices 105, information associated with received storage requests, information that facilitates the receipt of storage requests from one or more user devices 107, information associated with content items to be stored, unique identifiers generated in association with storage requests, information associated with the processing of content items, information associated with portions of content items to be uniquely processed on behalf of customers, information associated with the reconstruction of stored content items, and/or information associated with the communication of stored content items to content processing devices 105.

The content items 109 may include content items that have been stored by the content storage device 110 and/or associated identification information (e.g., an identifier of one or more requesting content processing devices, identifiers of customer accounts, etc.). According to an aspect of the invention, and as described in greater detail below with reference to FIG. 2, the stored content may include both unique copies of one or more portions of content items associated with respective customers that requested the content items, entire content items, and remainders of the content items following extraction of one or more portions. In some aspects, an entire content item and/or a remainder of the content item may be stored in a format that is unusable for its intended purpose. That is, in some examples, the entire content item or the remainder may not be playable by the content processing device 105 of the user even if successfully downloaded or otherwise transmitted. By way of example only, the content item may be encrypted and therefore unplayable, or the content item may be missing critical portions, such as but not limited to a header, an "I" frame, a vector quantity action matrix (e.g., in MPEG video), or the like. Additionally, the content items 109 may be stored in one or more internal memory devices (e.g., internal hard drives, internal flash drives, etc.) of the content storage device 110 and/or in one or more external memory devices accessible by the content storage device 110.

The OS 164 may be a suitable software module that controls the general operation of the content storage device 110. The OS 164 may also facilitate the execution of other software modules by the processors 152, for example, the one or more host modules 166 and/or the network storage module 168. The one or more host modules 166 may be suitable software modules that facilitate the establishment of a communications session with one or more content processing devices 105 and/or one or more user devices 107. In this regard, the content storage device 110 may receive one or more requests for storing content. For example, storage requests may be received over a service provider network (e.g., a cable network, a satellite network, etc.) from a content processing device 105 via a communications session established by a host module 166. As another example, a host module 166 may facilitate the establishment of a network session, such as a Web-based network session, with a user device 107 (e.g., a personal computer, a mobile device, etc.). During the established network session, a user request to store content may be received from the user device 107. In certain embodiments, the received request may be forwarded by the host module 166 to a content processing device 105 associated with the user of the user device 107. In other embodiments, the request may be processed by the network storage module 168 to facilitate network storage.

The network storage module 168 may be a suitable software module that facilitates the processing of storage requests, the storing of content items, and the distribution of content items to one or more content processing devices 105. In operation, the network storage module 168 may receive one or more requests to store a content item from any number of customer devices, such as the content processing devices 105 and/or the user devices 107. The network storage module 168 may then schedule storage of the content item on behalf of the various customers that requested the storage. For example, an identifier of the content item and a recording time for recording the content item may be added to a recording queue. Additionally, information associated with the customers that requested the recording of the content item may be stored. For example, identifying information for customer devices, a customer identifier, and/or customer account (e.g., billing account, service provider account, etc.) information may be stored.

Once a recording time (e.g., broadcast time, airing time, etc.) for recording the content item has been reached, the network storage module 168 may direct the recording of the content item received from the one or more content providers 151 on behalf of the one or more customers that requested the recording. According to an aspect of the invention, the network storage module 168 may direct and/or facilitate the storage of unique samples of the content item on behalf of the respective customers that requested recording of the content item. For example, the network storage module 168 may identify one or more portions of the content item to be uniquely stored on behalf of each of the requesting customers. The identified one or more portions may be extracted from the content item, and unique copies of the one or more portions may be respectively stored for each of the customers. Additionally, the remainder of the content item may be stored by the content storage device 110 following extraction of the one or more portions. In certain embodiments, the remainder may be stored separately from the copies of the extracted portions, thus, less memory may be utilized because only one copy of the remainder may be stored. Utilizing the stored one or more unique portions for a particular customer and the stored remainder, the network storage module 168 may subsequently reconstruct the content item, and provide the content item to the content processing device 105 of that customer.

As desired, a wide variety of suitable methods and/or techniques may be utilized by the network storage module 168 to facilitate the storage of unique recordings of a content item. For example, any number of portions of the content item may be identified and extracted from the content item. Each of the extracted portions may have any desired size, duration, or length. For example, a portion of the content item having a predetermined length of time (e.g., one minute, two minutes, etc.) may be extracted from the content item at regular intervals (e.g., every five minutes, every ten minutes, etc.). Alternatively, a portion of the content item having a predetermined length of time may be extracted from the content item at irregular intervals as a function of the encryption keys 163 or a customer identifier. Once extracted, the one or more portions of the content item may be processed by the network storage module 168 in a manner that is unique to the customer that requested the content item. For example, the one or more extracted portions of the content item may be encrypted in a manner specific to the customer. In certain embodiments, the one or more extracted portions may be encrypted in a manner specific to a customer account or user account associated with the customer and/or one or more customer devices. Subsequently, the extracted portions may be accessed by the network storage module 168 from memory, decrypted or processed if necessary, and combined with the remainder of the content item in order to reconstruct the content item for the customer.

As a result of encrypting or otherwise processing one or more extracted portions of the content item, a unique copy of the content item may be prepared for each customer that requests the content item. Because each copy of the extracted portions has been processed in a manner specific to each respective customer or each respective customer account, only the customer associated with each respective copy may be allowed to download and consume (e.g., view, listen to, etc.) the particular copy of the content item. In other words, a reconstructed copy of the content item, which is formed by merging the processed (e.g., encrypted) extracted portions and a remainder of the content item, may only be accessible by a customer that requested the particular recording of the content item and that is associated with that extracted portion. Additionally, as a result of uniquely processing only portions of the content item rather than the entire content item, the storage space utilized by the content storage device may be reduced. Additionally, it may be possible to only store a copy of the remainder. Thus, less memory may be utilized to store unique portions (e.g., slices, etc.) of a content item on behalf of each requesting customer than would be utilized if unique copies of the entire content item are stored for each requesting customer.

In certain embodiments, the network storage module 168 may generate a unique identifier (e.g., a memory location identifier, a bookmark, a pointer, etc.) and/or access credentials that may be utilized by one or more content processing devices 105 to download or obtain the content item. For example, a unique identifier may be generated for each respective extracted portion or set of extracted portions. The network storage module 168 may communicate the unique identifier and/or access credentials to any number of content processing devices 105 associated with user requests for the content item. In certain embodiments, the unique identifier may be communicated prior to the completion of the storage and, as desired, another message may be communicated to one or more content processing devices 105 to indicate that the storage has been completed. In other embodiments, the unique identifier may be communicated following the completion of the storage. In another embodiment, the unique identifier may be communicated upon inquiry of the completion of storage.

The network storage module 168 may additionally be configured to process requests received from the content processing devices 105 to download a recorded content item. If a received request is a request to download a content item via a dynamic download session, then the network storage module 168 may determine whether network resources are available to establish a dynamic download session. If resources are available, then the network storage module 168 may establish the dynamic download session to download the whole content item after re-assembly, a processed portion of the content item, or the remaining portion of the content item. If resources are not available or if the request is not a request for a dynamic download session, then the network storage module 168 may evaluate one or more download parameters in order to determine whether the content may be downloaded to the requesting content processing device 105. In this regard, the network storage module 168 and/or the content processing device 105 may identify and/or schedule a time at which the content item will be downloaded. Once a download has been completed, the network storage module 168 may delete the unique portions of the stored content item that are associated with the customer. Additionally, in certain embodiments, the network storage module 168 may monitor a duration of time for which a content item will be stored. For example, the network storage module 168 may delete a stored content item (e.g., stored unique portions, a stored remainder, etc.) if the content item is not requested for download within a predetermined period of time (e.g., a week, etc.).

With continued reference to the content storage device 110, the one or more I/O interfaces 156 may facilitate communication between the content storage device 110 and one or more input/viewing devices, for example, one or more user interface devices, such as a display, keypad, mouse, pointing device, control panel, touch screen display, remote control, microphone, speaker, etc., that facilitate user interaction with the content storage device 110. In this regard, user commands may be received by the content storage device 110. The one or more network interfaces 158 may facilitate connection of the content storage device 110 to one or more suitable networks 112, for example, a broadband network or service provider network (e.g., a cable network, a satellite network, etc.) that facilitates communication with content processing devices 105 and/or one or more networks 112 (e.g., the Internet, etc.) that facilitate communications with any number of user devices 107.

As desired in certain embodiments, any number of user devices 107 may be utilized as desired in various embodiments of the invention. Examples of user devices 107 include, but are not limited to, personal computers, mobile devices, Internet appliances, etc. A user device 107 may be a suitable processor-driven device that permits a user to access one or more applications that allow the user to view available content and request recording of desired content. For example, a user may utilize a user device 107 to access a Web server, such as a Web server associated with the content storage device 110, that permits the user to request recording and/or storage. Certain components of a user device 107 may be similar to, or implemented by, the components described above for the content processing devices 105. In other words, the user device 107 may be a content processing device 105 and may also include any number of suitable processors, memory devices, I/O interfaces, and/or network interfaces.

Communications between various components of the architecture 100 may be facilitated via any number of suitable networks 112, such as one or more service provider networks (e.g., a cable network, a satellite network, etc.) and/or other networks. The networks 112 may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless.

Those of ordinary skill in the art will appreciate that the architecture 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Based at least in part upon the receipt of recording and/or storing requests for a content item from any number of customer devices, a wide variety of suitable techniques may be utilized to facilitate the recording and/or storing of the content item. Additionally, according to an aspect of the invention, a unique copy of portions of the content item may be stored in association with each requesting customer. Further, the unique copies of portions of the content may be encrypted using a particular key associated with each requesting customer. In this regard, any given copy of the content item may only be accessible and/or consumable by the customer associated with the copy.

Figure 2:
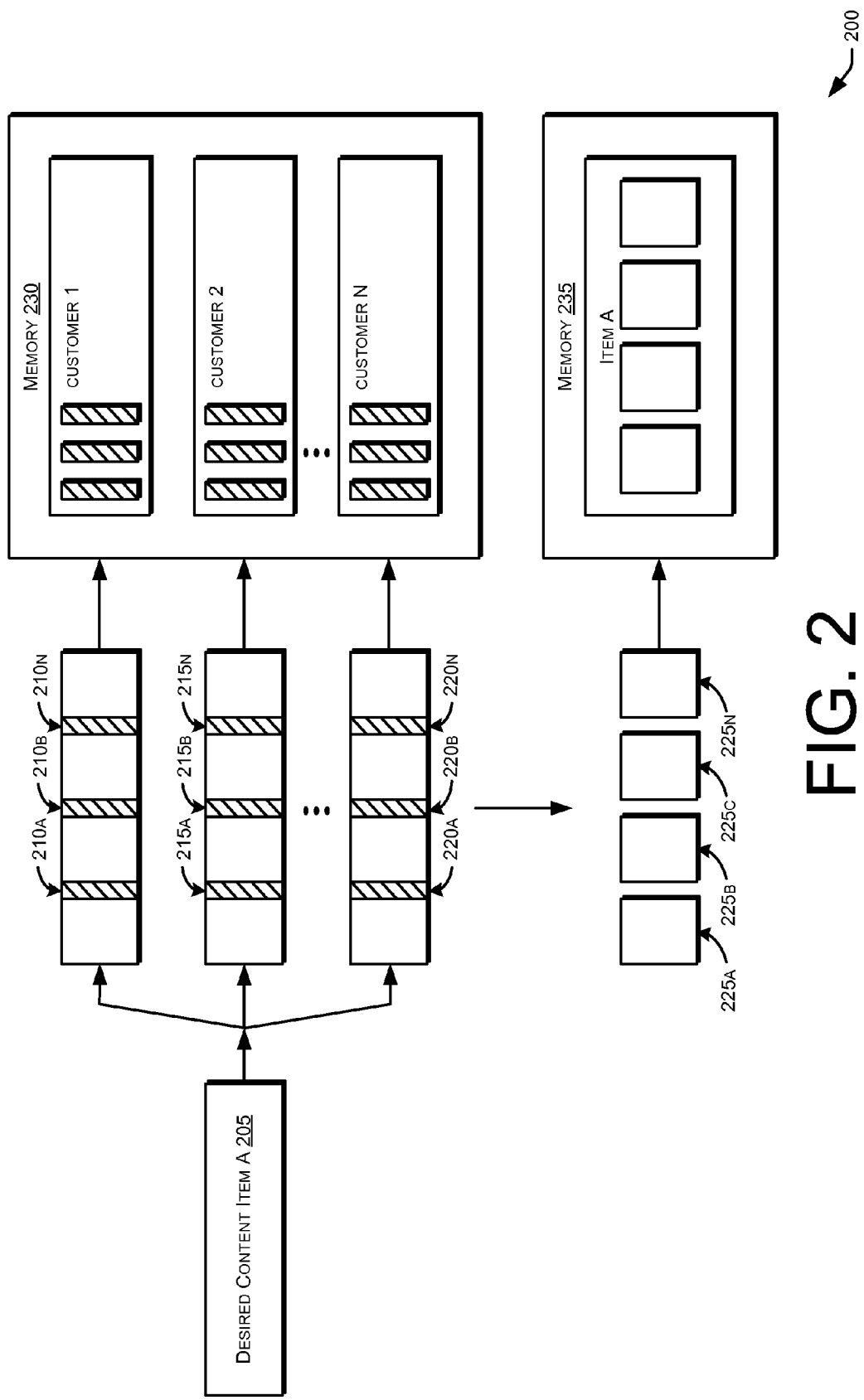
FIG. 2 illustrates a block diagram of one example data flow for recording and/or storing a content item by a content storage device, according to an illustrative embodiment of the invention.

FIG. 2 illustrates a block diagram of one example data flow 200 for recording and/or storing a content item by a content storage device, according to an illustrative embodiment of the invention. Following the receipt of one or more requests to record and/or store a content item 205, a content storage device, such as the content storage device 110 illustrated in FIG. 1, may schedule the recording and/or storing of the desired content 205. Additionally, the content storage device 110 may store identifying information associated with each customer that requested the recording and/or storing of the content item 205, such as device identifiers associated with customer devices, a customer identifier, and/or customer account identification information. In some examples, once a recording time has been reached for recording the content item 205, the content storage device 110 may initiate the recording of the content item 205.

According to an aspect of the invention, a unique copy of one or more portions of the content item 205 may be stored in association with each requesting customer. By way of example only, as used herein, a portion may include any data associated with a content item such as, but not limited to, header data, payload, etc. For example, as illustrated in FIG. 2, a copy of one or more portions, such as portions 210*a-n*, of the content item 205 may be identified and uniquely processed in association with a first customer. Similarly, a copy of one or more portions, such as portions 215*a-n*, of the content item 205 may be identified and uniquely processed in association with a second customer, and so on until a copy of portions 220*a-n* of the content item 205 is identified and uniquely processed in association with an nth customer that requested recording of the content item 205. In certain embodiments of the invention, the one or more portions that are processed on behalf of the various customers may be the same portions of the original content item 205. Further, portions of the original content item 205 may be extracted, and the extracted portions may be separately copied and processed on behalf of each customer. The unique portions may be stored in a memory such as the memory 134 or the memory 154 of FIG. 1, or in a memory 230 as shown in FIG. 2. Additionally, the remainder 225*a-n* (i.e., the content item 205 absent the extracted portions 210*a-n*, 215*a-n*, or 220*a-n*)

may be stored in a memory such as the memory 134 or the memory 154 of FIG. 1, or also in a memory 235 as shown in FIG. 2.

In some aspects, one or more copies of the content item 205 may be stored. By way of example only, FIG. 2 shows three copies, one for customer 1, one for customer 2, and one for customer n. From each copy, the content storage device 110 may extract a portion as shown in memory 230. The portions assigned in the memory 230 to customers 1-n may be unique in that they are each associated with a different customer. Further, in other embodiments, each extracted portion may be copied and processed separately. For example, portions 210a-n may assigned to a customer, encoded, encrypted, or otherwise processed in a manner that is unique to other portions, for example 215a-n and/or 220a-n, even if customers 1-n each requested the same content item 205.

Any number of portions of the content item 205 may be extracted and processed as desired in various embodiments of the invention. Additionally, each of the portions may be of any size, length, or duration. In certain embodiments, separate extracted portions may have a similar size, duration, or length. In other embodiments, the size, duration, or length of extracted portions may be varied. Additionally, in certain embodiments, portions may be extracted from the content item 205 in accordance with a repeating pattern. For example, a certain duration of content may be extracted at given intervals as the content item 205 is processed. As one example, a respective portion having a desired duration (e.g., a portion having a duration of approximately 30 seconds, one minute, or any other desired duration) may be extracted at given time intervals, such as every ten minutes, every 30 minutes, or some other time interval. As another example, a respective portion having a desired duration may be extracted as a function of a user account. As a result of extracting portions of the content item 205, the original content item 205 can only be satisfactorily consumed (e.g., viewed, listened to, etc.) by a customer if the extracting portions are recombined with the remainder 225a-n of the content item 205. In other words, the content item 205 may be in an unusable format in the memory 235, or the memory 154 of FIG. 1, until reconstructed.

A wide variety of suitable methods and/or techniques may be utilized as desired to process the unique copies of the extracted portions of the content item 205. For example, with reference to a first customer or user 102a of FIG. 1, the extracted portions 210a-n of the content item 205 may be encrypted, encoded, or otherwise processed in a manner that is unique to the first customer. For example, information associated with the first customer 102a, such as but not limited to an account number, customer profile information, etc., may be utilized to encrypt the extracted portions 210a-n. As another example, a shared secret (e.g., a public-private key pair, etc.) between a content processing device 105 associated with the first customer and the service provider may be utilized to encrypt or encode the extracted portions 210a-n. As yet another example, the content storage device 110 may select an encryption or encoding method, and decryption information may be generated or identified for communication to a content processing device associated with the first customer. In a similar manner, copies of the extracted portions 215a-n, 220a-n may respectively be processed on behalf of the other customers that requested recording of the content item 205.

Once the unique copies 210a-n, 215a-n, 220a-n of the portions of the content item 205 have been processed, the unique copies 210a-n, 215a-n, 220a-n may be stored in one or more suitable memories 230 for subsequent access by the content storage device 110. Additionally, the remainder 225a-n of the content item 205 following extraction of the one or more portions that are uniquely processed for each customer may be stored in one or more suitable memories 235. In certain embodiments, the remainder 225a-n of the content item 205 may be stored separately from the stored unique copies 210a-n, 215a-n, 220a-n of the extracted portions. Additionally, as desired, one or more markers and/or other information may be stored that facilitate the insertion of a copy of the extracted portions into the remainder 225a-n in order to reconstruct the original content item 205.

As a result of storing merely unique copies of extracted portions of the content item 205 along with one remainder (i.e., the content item without the extracted portions), the memory resources utilized to store copies of the content item 205 on behalf of a plurality of customers may be reduced. In other words, less memory may be utilized than that required to store a unique copy of the entire content item 205 on behalf of each of the customers. Additionally, in order to reconstruct the original content item 205, both a unique copy of the extracted portions and the remainder 225a-n of the original content item 205 may be utilized. Accordingly, because the various copies of the extracted portions are uniquely accessible only by the customers that requested storage of the content item 205, copies of the original content item 205 may, in some examples, only be permitted to be reconstructed for consumption by the particular customers associated with each of the copies of the extracted portions. In other words, extracted portions of the content stored on behalf of a first customer may not be permitted to be utilized to reconstruct the content on behalf of a second customer. In this regard, the storage of unique copies of the original content item 205 on behalf of a plurality of customers may be achieved without recording unique copies of the entire content item on behalf of each customer.

Additionally, in some embodiments, each extracted portion a-n or a copy of a set of unique portions, such as 210a-n, may be encrypted prior to being stored in the memory 230. In some aspects, each encryption may be performed with a key specific to the customer making the recording and/or storing request. In this way, even if the same portions are extracted from the content item 205 for each user 102a-n, the stored portions may still be unique. That is, in the event that a first and second user request the same content to be recorded and/or stored, and if the content storage device 110 extracts the same portions for each user (e.g., if 210a-n and 215a-n are identical), the copy stored in the memory 230 may still be unique for each user because a different encryption key was used. Additionally, in one aspect, encryption keys may be stored in the encryption key(s) database 163 and utilized by the content storage device 110 to decrypt the stored portions when a content processing device 105 requests the content item 205. However, in some aspects, encryption keys may be stored with the stored content 142 of the content processing device 105 and transmitted to the content storage device 110 with the request for the desired content.

Illustrative Processes

Figure 3:
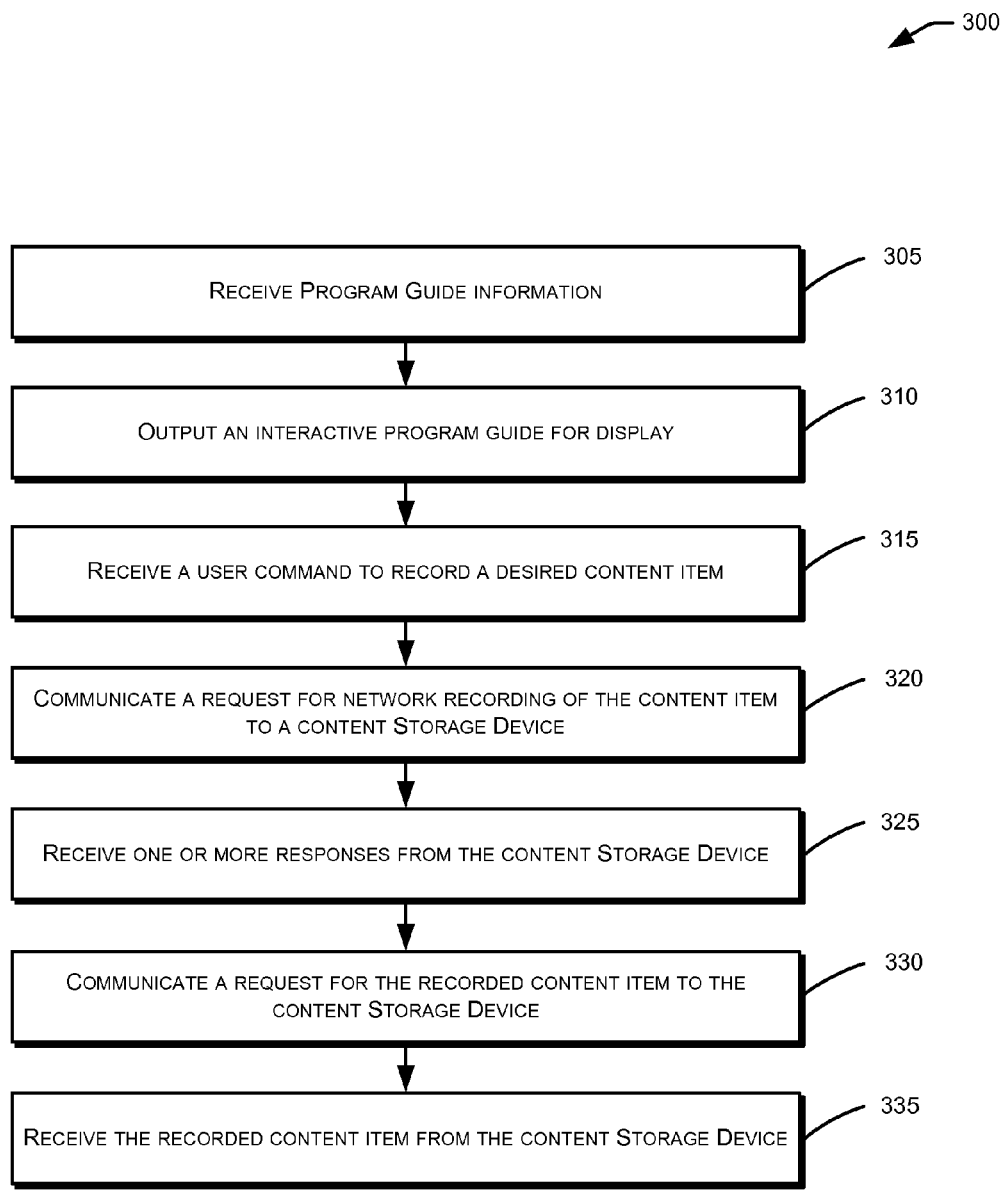
FIG. 3 illustrates a flow diagram of one example method that may be performed by a content storage device to request a content item, according to an example embodiment of the invention.

FIG. 3 illustrates a flow diagram of an example method 300 that may be performed by a customer device to request a content item by a content storage device, such as the content storage device 110 illustrated in FIG. 1. The method may be performed by any number of suitable customer devices, such as one of the content processing devices 105 illustrated in FIG. 1 or one of the user devices 107 illustrated in FIG. 1. In certain embodiments, the method 300 may be performed by a suitable IPG application and/or recording module associated with a content processing device 105, such as the IPG application and/or recording module 148 illustrated in FIG. 1.

The method 300 may begin at block 305, where program guide information, such as electronic or interactive program guide information, may be received by a content processing device 105. For example, IPG information may be included in a broadband signal received by the content processing device 105. At block 310, at least a portion of the received IPG information may be utilized to generate an IPG display, such as an IPG grid, and the IPG display may be output for presentation or display to a user of the content processing device 105. In certain embodiments, the IPG display may be output in response to a received user request for the IPG display. Once the IPG display has been output, a user may navigate through the IPG display, and the user may select a content item to be recorded. In this regard, a user command to record a content item may be communicated to the content processing device, and the user command may be received at block 315.

At block 320, a request for network recording of the content item may be generated by the content processing device 105. As desired, a wide variety of different types of information may be included in a generated recording request, such as an identifier of a content processing device 105, identification information and/or access credentials for a customer, an identifier of the content item, and/or a recording time for the content item. Once generated, the request may be communicated to an appropriate content storage device associated with a service provider, such as the content storage device 110 illustrated in FIG. 1. The request may be communicated via any number of suitable service provider networks, such as a cable network or a satellite network.

Although the generation of a recording request is described above as being performed by a content processing device, a recording request may also be made by a user device 107. For example, a customer may utilize a personal computer, a mobile device, or other suitable user device to access a Web server hosted by the service provider. In doing so, the customer may select a content item to be recorded, and a request to record the content item on behalf of the customer may be provided to the content storage device 110.

At block 325, one or more responses to the communicated request may be received by the content processing device 105 (or a user device 107) from the content storage device 110. A received response may include information indicating whether or not the content item has been authorized for recording by the content storage device 110 (e.g., whether the customer has rights to record the content item, whether the content is permitted to be recorded, whether network resources are available, etc.). Additionally, in the event that a network recording is authorized and/or performed, a received response may include information that facilitates a subsequent download of the content item from the content storage device 110. For example, a received response may include a unique identifier and/or access credentials that facilitate a subsequent download of the content item.

At block 330, a request for the recorded content item may be generated by the content processing device 105, and the generated request may be communicated to the content storage device 110. A wide variety of different information may be included in the request as desired in various embodiments of the invention, such as identification information for the content processing device 105, identification information for the customer, customer account information, access information, one or more unique identifiers associated with unique portions of the content item stored on behalf of the customer, and/or information that may be utilized to decrypt or decode unique portions of the content item. Once a request for the recorded content item is received and processed by the content storage device 110, the content item may be reconstructed by the content storage device 110 and communicated to the content processing device 105 at block 335, where the method 300 may end. In certain embodiments, encrypted or encoded portions of the content item may be decrypted or decoded by the content storage device 110. In other embodiments, the content processing device 105 may decrypt or decode these portions. Additionally, as discussed in greater detail above with reference to FIG. 1, a wide variety of suitable methods and/or techniques may be utilized to communicate the content item to the content processing device.

Once the content item has been received from the content storage device 110, the content processing device 105 may further process the content item. For example, the content processing device 105 may format the content item for presentation to one or more users, and the content item may be output for presentation. As another example, the content processing device may direct the storage of the desired content in one or more suitable memory devices associated with the content processing device 105.

Figure 4A:
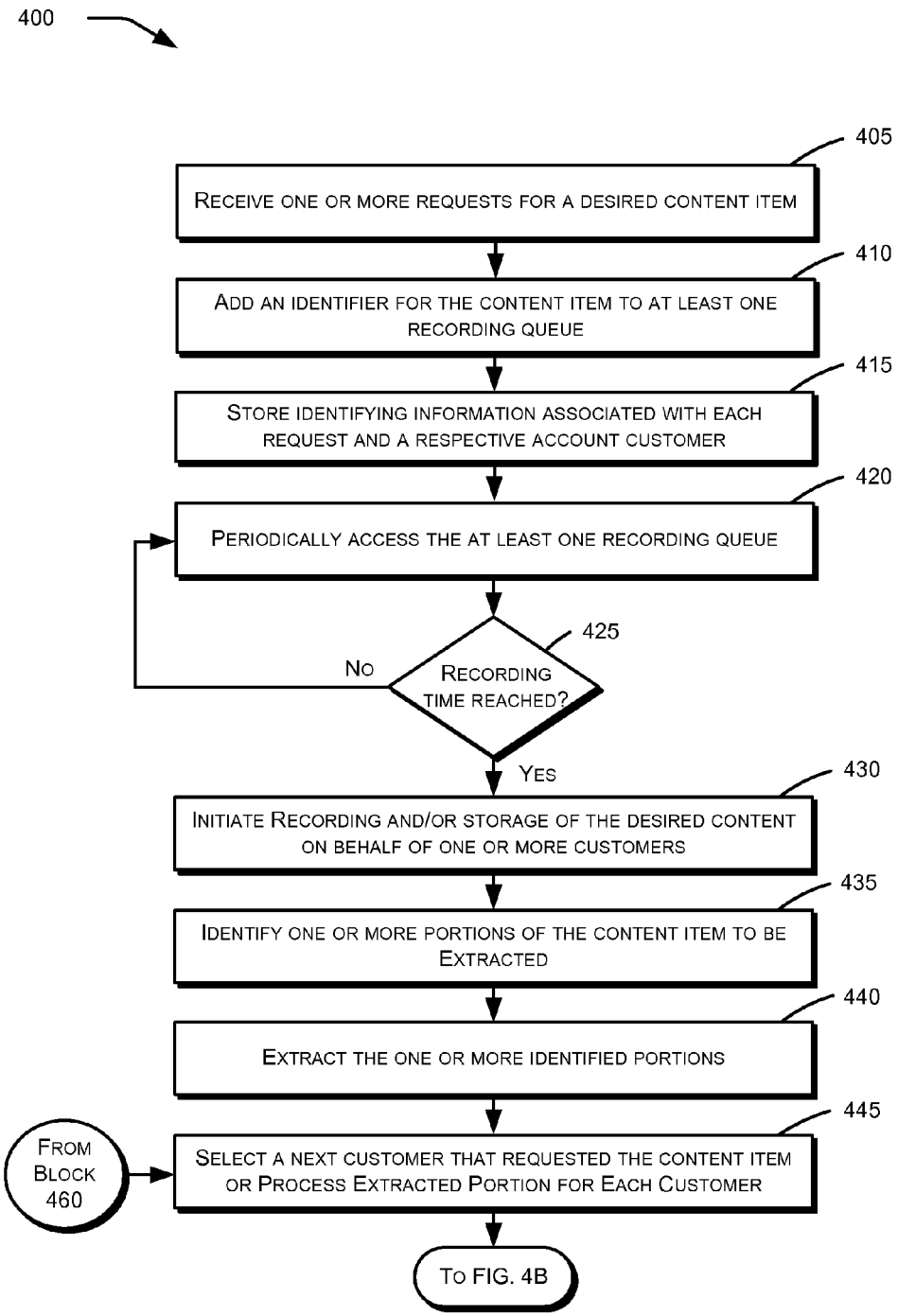
FIGS. 4A, 4B, and 4C illustrate a flow diagram of one example method for recording and/or storing a content item by a content storage device as well as for providing a stored content item to a content processing device of a user, according to an illustrative embodiment of the invention.
Figure 4B:
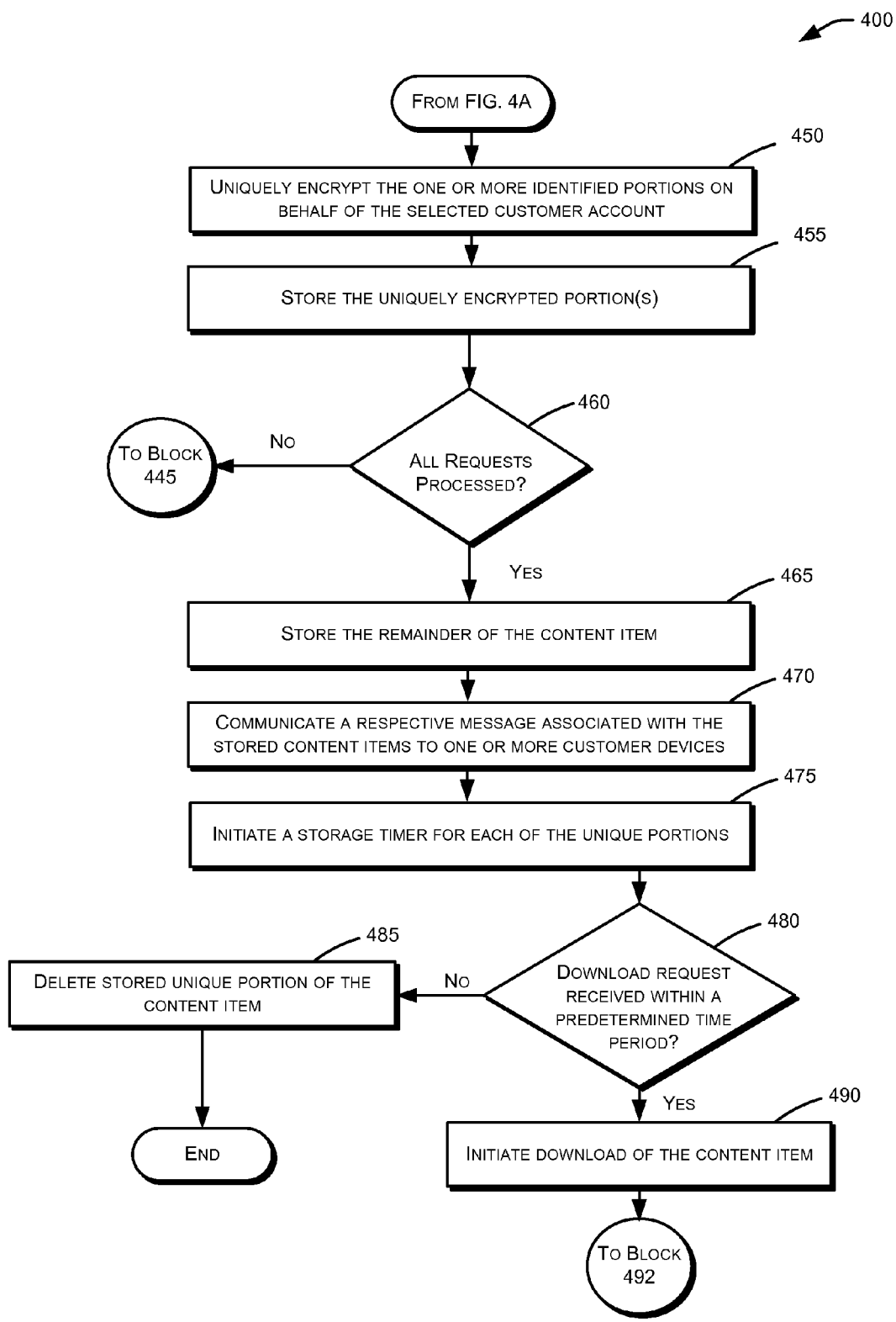
Figure 4C:
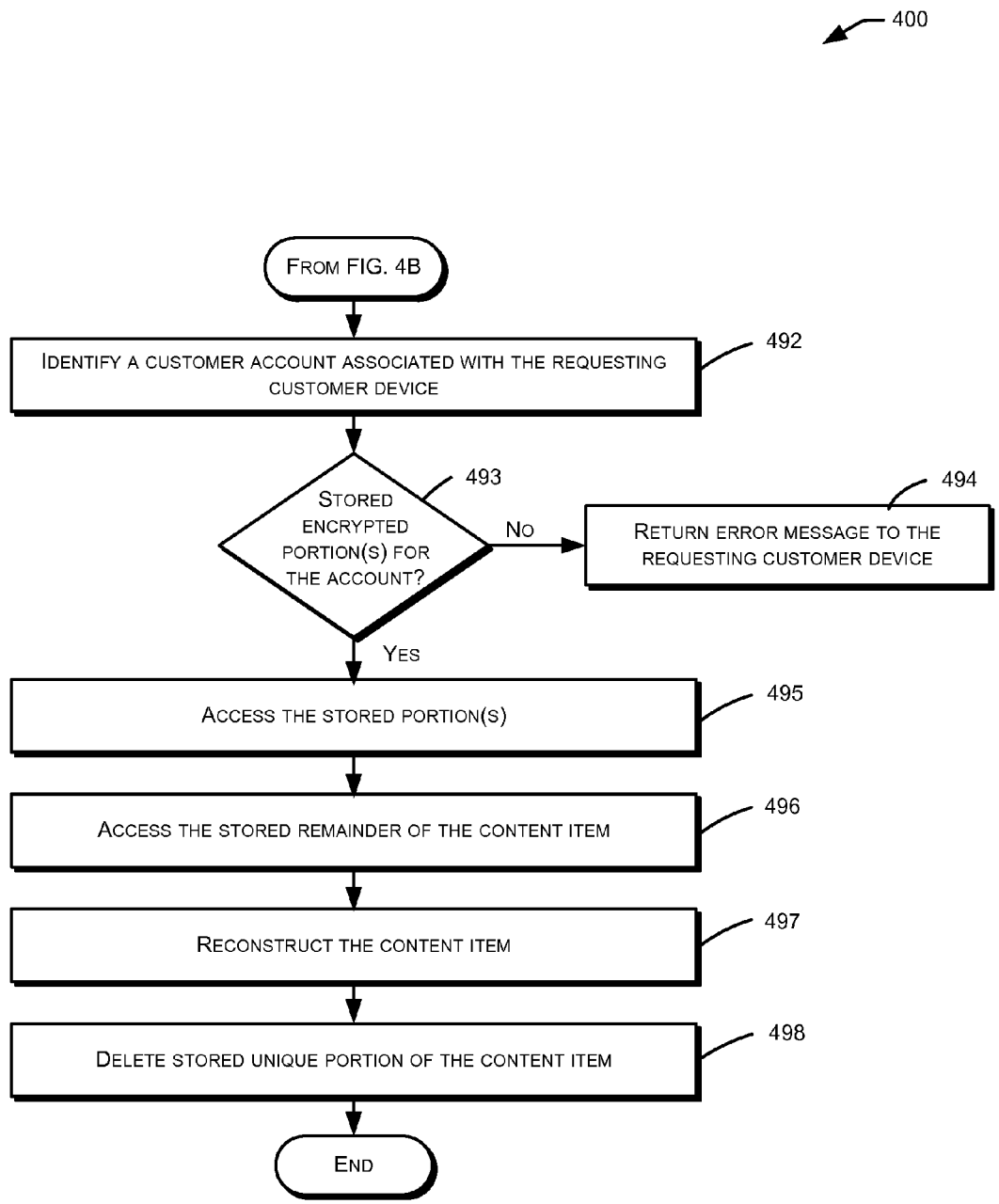

FIGS. 4A, 4B, and 4C illustrate a flow diagram of an example method 400 that may be performed by a content storage device, such as the content storage device 110 illustrated in FIG. 1, to facilitate the network storage and/or recording of a content item. The operations of the method 400 may be performed by a suitable host module and/or network recording module associated with a content storage device, such as the host module 166 and/or network storage module 168 illustrated in FIG. 1. The method 400 may, in some aspects, begin at block 405.

At block 405, one or more requests for a content item may be received by the content storage device 110. As desired, a request may be received from a suitable content processing device, such as one of the content processing devices 105 illustrated in FIG. 1. For example, a customer may utilize an interactive program guide to select a content item for recording and/or storing, and a storage and/or recording request may be communicated to the content storage device 110 based at least in part upon the user request. Additionally or alternatively, a request to record the content item may be received from one or more suitable user devices, such as the user devices 107 illustrated in FIG. 1. As desired, a wide variety of different information may be included in a received request, such as an identifier of a content processing device 105 or user device associated with a customer, customer identification information, customer account information, identification information for a content item, and/or a recording time associated with the content item.

At block 410, an identifier associated with the content item may be added to a recording queue associated with the content storage device 110. In this regard, a subsequent storage and/or recording of the content item may be scheduled and/or facilitated. A wide variety of suitable information may be stored in the recording queue as desired in various embodiments, including but not limited to, an identifier of the content item and a recording time associated with the content item. Additionally, at block 415, identifying information associated with each of the received requests and/or with a respective account customer may be stored. A wide variety of identifying information may be stored as desired including, but not limited to, customer identifiers, customer device identifiers, and/or customer account identifiers.

At block 420, the recording queue may be periodically accessed in order to facilitate the recording of the content items. For example, the recording queue may be accessed every five seconds, every fifteen minutes, every thirty minutes, or at another appropriate time interval in order to identify content items to be recorded. A determination may be made at block 425 as to whether a recording time for a content item (e.g., a broadcast or airing time for the desired content) has been reached. If it is determined at block 425 that a recording time has not been reached, then operations may continue at block 420 described above. If, however, it is determined at block 425 that a recording time for a content item has been reached, then operations may continue at block 430.

At block 430, a recording and/or storing of the content item may be initiated on behalf of the one or more customers that requested the storage and/or recording of the content item. For example, the content storage device 110 may initiate storage of the content item in a buffer or memory. At block 435, one or more portions, segments, or sections of the content item that will be uniquely stored on behalf of each customer may be identified. For example, portions or segments of the content item having a predetermined size or duration may be periodically identified. Once identified, the one or more portions may be extracted from the content item at block 440. For example, the one or more portions may be stored in one or more separate buffers or memories to facilitate independent processing of the one or more portions.

At block 445, a next customer or a next customer account that requested storage and/or recording of the content item may be selected. In this regard, a unique copy of the extracted one or more portions may be generated and stored on behalf of the customer and/or in association with the customer account. In certain embodiments, all customer recording requests may be executed in parallel, relating one process instance with each customer. For example, a recording associated with a customer recording request need not be completed prior to beginning a recording associated with a next customer recording request. At block 450, the one or more portions may be uniquely encrypted, encoded, or otherwise processed on behalf of the selected customer or the selected customer account. As a result, a unique copy of the one or more portions may be prepared for the selected customer, and the unique copy may be accessible by the customer and/or by customer devices associated with the customer account. Once a unique copy of the one or more portions has been generated, such as a uniquely encrypted copy of the one or more portions, the unique copy may be stored in one or more suitable memory locations at block 455. In certain embodiments, the unique copy may be stored in association with the customer or the customer account or on a device of the customer or the customer account.

As desired, one or more unique identifiers (e.g., a location identifier, pointer, bookmark, etc.) and/or other access information (e.g., access credentials, etc.) associated with the unique copy of the portions may be generated. The generated information may facilitate a subsequent download of the content item by one or more customer devices. For example, a unique identifier may identify one or more memory locations at which the unique copies of the one or more portions are stored.

At block 460, a determination may be made as to whether all customer recording requests for the content item have been processed. If it is determined at block 460 that all customer recording requests have not been processed, then operations may continue at block 445, and a next customer or next customer account may be selected for processing. In this regard, a unique copy of the extracted one or more portions may be stored in association with each of the requesting customers. If, however, it is determined at block 460 that all requests have been processed, then operations may continue at block 465.

At block 465, the remainder of the content item may be stored in one or more suitable memories. In other words, following the extraction of one or more portions from the content item, the remainder of the content item may be stored. In certain embodiments, the remainder of the content item may be stored separately from any unique copies of the one or more extracted portions. For example, the remainder may be stored in a separate memory or in a separate memory location. The remainder of the content may be the full content if each customer extraction is unique. Additionally, as desired, a wide variety of identification information may be stored in association with the stored remainder, such as one or more markers that facilitate the insertion of the various unique copies of the extracted portions into the remainder to reconstruct the content item and/or one or more respective identifiers for the unique copies of the extracted portions. In certain embodiments, an identifier (e.g., a memory location, etc.) may also be generated for the remainder, and the generated identifier may be stored in association with the unique copies of the extracted portions. Indeed, a wide variety of reference and/or linking information may be stored in order to facilitate the reconstruction of the content item on behalf of a requesting customer.

At block 470, any number of messages associated with the stored content items may be generated by the content storage device 110 and communicated to a wide variety of different customer devices. For example, respective messages indicating that the content item has been recorded by the content storage device 110 may be communicated to customer devices associated with the various customers that requested recording of the content item on a notification or a request basis. A wide variety of suitable information may be included in one or more messages that are communicated to customer devices including, but not limited to, an indication that a recording of the content item has been initiated, an indication that a recording of the content item has been completed, one or more identifiers associated with a unique copy of the extracted portions of the content item, access credentials associated with the content item, decryption and/or decoding information that may be utilized to decrypt or decode portions of the content item, and/or an invitation to access the content storage device 110 to download the content item.

At block 475, which may be optional in certain embodiments of the invention, a storage timer may be initiated for each of the unique copies of the extracted portions of the content item and/or for the remainder of the content item. Alternatively, a single timer may be utilized in association with all of the unique copies. In this regard, the content storage device 110 may ensure that recorded content is only maintained at the network or cloud level for a predetermined period of time. In other words, recorded content may only be maintained for a limited period of time as set forth by a contractual or other licensing requirement. At block 480, a determination may be made as to whether a download or access request for a unique copy (e.g., unique portions and the remainder) of the content item is received from a customer device (e.g., a content processing device) within a predetermined time period, such as expiration of a storage timer or prior to the storage timer reaching a threshold value. If it is determined at block 480 that a download request is not received, then the stored unique portions of the content item may be deleted or removed from memory at block 485. As desired, the stored remainder may also be deleted. For example, if the same time period is utilized for a plurality of customers, then each of the unique copies and the stored remainder may be deleted upon expiration of an appropriate timer.

If, however, it is determined at block 480 that a download or access request for a unique copy of the content item is received within a predetermined period of time, then operations may continue at block 490, and a download of the content item may be initiated.

At block 492, a customer account (or other customer identifier) associated with the requesting customer device may be identified. For example, a device identifier associated with the requesting customer device may be utilized to access a repository of customer account information, such as a database or table that maps customer devices to customer accounts. Once a customer account has been identified, a determination may be made at block 493 as to whether a unique copy of one or more portions (e.g., encrypted portions, encoded portions, etc.) of the content item has been stored in association with the customer account. For example, one or more memories utilized to store recorded content may be searched utilizing the customer account number or a customer identifier. As another example, one or more unique identifiers for stored portions of the content item may be received from the requesting customer device, and the one or more unique identifiers may be utilized to access the one or more memories and determine whether a unique copy is available for the customer or customer account.

If it is determined at block 493 that a unique copy of one or more portions of the content item is not available for the customer or customer account, then operations may end at block 494 where an error message may be generated and returned to the requesting customer device. The error message may include an indication that the content item is not available for download by the customer. If, however, it is determined at block 493 that a unique copy of one or more portions of the content item is available, then operations may continue at block 495.

At block 495, the stored unique portions of the content item that are associated with the requesting customer may be accessed from memory. As desired in certain embodiments, the accessed portions may be processed in order to facilitate consumption of the content item by the customer. For example, the accessed portions may be decrypted or decoded. In other embodiments, decryption, decoding, and/or other processing of the accessed portions may be performed by a customer device. For example, a content processing device associated with the requesting customer may facilitate a decryption or decoding of the unique portions of the content item.

At block 496, the stored remainder of the content item may be accessed from memory. The content item may then be reconstructed at block 497 by combining the accessed unique portions and the accessed remainder. A wide variety of suitable methods and/or techniques may be utilized as desired to reconstruct the content item. For example, one or more markers included in the stored remainder may be utilized to facilitate insertion of the one or more unique portions. Once reconstructed, the content item may be downloaded or communicated to a requesting customer device, such as a requesting content processing device associated with the customer account. Additionally, as mentioned above, a wide variety of suitable methods and/or techniques may be utilized to download the content item. For example, the content item may be downloaded in the background, based upon a specific user request for the content item, and/or in a dynamic download session.

At block 498, which may be optional in certain embodiments of the invention, the stored unique portions of the content item that are associated with the requesting customer may be deleted from memory. In other words, once the content item is accessed by a customer, the unique portions of the content stored by the content storage device 110 may be deleted at block 498. Alternatively, in other embodiments, the unique stored portions may be maintained for a predetermined period of time. In this regard, a customer may access the content item from a plurality of different customer devices associated with a customer account. In some aspects, the method 400 may end following block 485 or block 498.

The operations described and shown in the methods 300 and 400 of FIGS. 3 and 4A-4C may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3 and 4A-4C may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A method for storing content, the method comprising:
   receiving, by a content storage device from a customer, a request for a content item, wherein the content storage device is associated with the customer and a plurality of other customers;
   extracting a portion of the content item in response to the request for the content item from the customer;
   storing, by the content storage device, the extracted portion of the content item specific to the customer; and
   directing storage, to the content storage device, of a remaining portion of the content item separately from the stored extracted portion, wherein the remaining portion of the content item is accessible by the customer and the plurality of other customers associated with the content storage device.

2. The method of claim 1, further comprising:
   uniquely encoding the extracted portion specific to the customer;
   storing, by the content storage device, the uniquely encoded portion of the content item instead of the extracted portion; and
   directing storage of the remaining portion of the content item separately from the stored encoded portion.

3. The method of claim 1, wherein directing the storage of the remaining portion of the content item comprises directing that the remaining portion be stored in a format unusable for its intended purpose.

4. The method of claim 1, wherein directing the storage of the remaining portion of the content item comprises storing, by the content storage device, the remaining portion on a local storage device.

5. The method of claim 1, wherein directing the storage of the remaining portion of the content item comprises transmitting, by the content storage device, the remaining portion for storage on a remote storage device associated with the customer.

6. The method of claim 1, further comprising encrypting, by the content storage device, the extracted portion of the content item in a manner specific to the customer.

7. The method of claim 1, wherein storing the extracted portion of the content item specific to the customer comprises storing a plurality of extracted portions of the content item as a unique recording.

8. The method of claim 1, wherein the request comprises a first request, and further comprising:
   receiving, by the content storage device from the customer device, a second request for the content item;
   reconstructing, by the content storage device based at least in part on the stored extracted portion and the stored remaining portion, the content item; and
   communicating, by the content storage device, the reconstructed content item to the customer.

9. The method of claim 1, wherein the customer comprises a first customer and the request comprises a first request, and further comprising:
   receiving, by the content storage device from a second customer, a second request for the content item; and
   storing, by the content storage device based at least in part upon the received second request, the extracted portion of the content item specific to the second customer without the remaining portion of the content item.

10. A system, comprising:
    at least one communications interface configured to receive, from a customer and a plurality of other customers, a request to record a content item;
    at least one processor configured to (i) extract a portion of the content item in response to the request to record the content item from the customer, (ii) direct storage of the extracted portion of the content item specific to the customer, and (iii) direct separate storage of a remainder of the content item, wherein the remainder of the content item is accessible by the customer and the plurality of other customers; and
    a memory storage device configured to store the extracted portion of the content item and the remainder of the content item.

11. The system of claim 10, wherein the at least one processor is further configured to encrypt the extracted portion of the content item in a manner specific to the customer, and
    wherein the stored extracted portion of the content item comprises the encrypted portion.

12. The system of claim 10, wherein the stored extracted portion of the content item comprises a plurality of separate extracted portions of the content item.

13. The system of claim 10, wherein:
    the request comprises a first request,
    the at least one communications interface is further configured to receive, from the customer, a second request for the content item; and
    the at least one processor is further configured to (i) reconstruct, based at least in part on the stored extracted portion and the stored remainder, the content item, and (ii) direct the at least one communications interface to communicate the reconstructed content item to the customer.

14. The system of claim 10, wherein:
    the customer comprises a first customer;
    the request comprises a first request;

the at least one communications interface is further configured to receive, from a second customer, a second request for the content item;

the at least one processor is further configured to direct, based at least in part upon the received second request, storage of the extracted portion of the content item specific to the second customer; and the memory storage device further configured to store the extracted portion specific to the second customer.

15. The system of claim 10, wherein the remainder of the content item is stored in a format unusable for its intended purpose.

16. One or more non-transitory computer-readable media storing computer-executable instructions that, when executed by at least one processor, configure the at least one processor to perform operations comprising:

receiving respective requests from a plurality of customers to record a content item wherein the plurality of customers are associated with a content storage device;

processing the content item, based at least in part on the received requests, in order to extract a portion of the content item in response to the respective requests to record the content item from the plurality of customers;

processing the extracted portion in order to uniquely encode the extracted portion in association with each of the plurality of customers;

storing the respective uniquely encoded portion in association with each of the plurality of customers on the content storage device; and storing, separately from the stored uniquely encoded portion on the content storage device, a remainder of the content item, wherein the remainder of the content item is accessible by each of the plurality of customers.

17. The one or more non-transitory computer-readable media of claim 16, wherein the remainder of the content item comprises the content item without the extracted portion.

18. The one or more non-transitory computer-readable media of claim 16, wherein extracting a portion of the content item comprises extracting a plurality of portions of the content item.

19. The one or more non-transitory computer-readable media of claim 16, further comprising:

receiving a second request for the content item;

reconstructing the content item based at least in part on the stored remainder and the stored uniquely encoded portion associated with the customer that requested the content item; and communicating the reconstructed content item to the requesting customer.

20. The one or more non-transitory computer-readable media of claim 16, wherein storing the respective uniquely encoded portions comprises storing each of the respective uniquely encoded portions for a predetermined period of time.

* * * * *